HERBERT L. REITZES
INVENTOR.

BY Lyon & Lyon
ATTORNEYS

HERBERT L. REITZES
INVENTOR.

BY Lyon & Lyon
ATTORNEYS

Aug. 12, 1969   H. L. REITZES   3,461,271
AUTOMATIC HEAT SEALING MECHANISM FOR PACKAGING MACHINES
Filed March 21, 1967   3 Sheets-Sheet 3

HERBERT L. REITZES
INVENTOR.

BY Lyon & Lyon
ATTORNEYS

United States Patent Office 3,461,271
Patented Aug. 12, 1969

3,461,271
AUTOMATIC HEAT SEALING MECHANISM FOR PACKAGING MACHINES
Herbert L. Reitzes, Beverly Hills, Calif., assignor to Quickpak Machinery Corp., Los Angeles, Calif., a corporation of California
Filed Mar. 21, 1967, Ser. No. 624,852
Int. Cl. H05b 1/00, 3/02; B65b 9/12
U.S. Cl. 219—243                                    7 Claims

ABSTRACT OF THE DISCLOSURE

A heat sealing mechanism for packaging machines in which an article is packaged within a plastic film, employing a heating element which is impressed against the plastic film together with a control device for automatically maintaining the pressure of the heating element against the film, controlling the heating and cooling cycles of said element and then releasing the heating element from the film.

---

The present invention relates generally to packaging machines in which articles are packaged in shrinkable or nonshrinkable plastic film wherein the edges of the film are sealed after the product is inserted forming a complete package. More specifically, the present invention relates to an automatic heat sealing mechanism which closes the open sides of the package, heats the film until it seals, at the same time severing the sealed portion from a continuous strip of film, whereupon the mechanism holds the seal until it cools sufficiently to remain sealed, and then removes the sealing element providing a finished package.

Packaging machines employing shrinkable and nonshrinkable plastic films are well known in the art and it is also known to use a continuous strip of plastic film forming an envelope into which products can be inserted whereupon a heated element is used to sever enough for each individual package at the same time sealing the package at the severed location forming a finished package. Such packaging operations have normally been done by hand or by rather complex automatic devices. One such device includes a heating element mounted upon a frame which is lowered onto the film after the product has been inserted, and the lowering of the frame is accomplished with pneumatic or hydraulic cylinders. Such a machine thus requires not only electrical power for the heating elements and other controlled devices, but hydraulic or pneumatic pressure systems for the control of the sealing element. This necessarily increases the cost of any such sealing machine. Further difficulties are encountered with previous sealing machines in that it is necessary to control the pressure of the sealing elements upon the plastic film as well as the time during which this pressure is applied. For different film thicknesses, the amount of heat or the period during which heat is applied by the sealing element will vary. In addition, after heat is applied by the sealing element, it is necessary to maintain pressure on the sealed portion of film while the area is allowed to cool so that when the sealing element is lifted the seal will not be broken. All of this requires timing and adjustment which is difficult and costly to maintain with previous devices.

The present invention has solved the above-mentioned difficulties by eliminating the necessity for separate pneumatic or hydraulic systems. The present invention employs an electromagnetic hold-down device which holds the sealing element in the proper position under the proper pressure and the timing during which this pressure is applied is more easily controlled through electrical control means. The same timing control which is applied to the electromagnetic system also controls the heating and cooling cycle of the heating element.

It is an object therefore of the present invention to provide an improved heat sealing machine.

It is also an object of the present invention to provide a heat sealing mechanism which is automatically controlled without the necessity for costly hydraulic or pneumatic systems.

More specifically, it is an object of the present invention to provide a heat sealing mechanism which automatically controls the amount of sealing pressure, the period during which pressure is applied, and the periods for heating and cooling of the sealing elements.

Further objects and advantages of the present invention will become more apparent upon reading the following detailed description in conjunction with the accompanying drawings in which.

Figure 1:
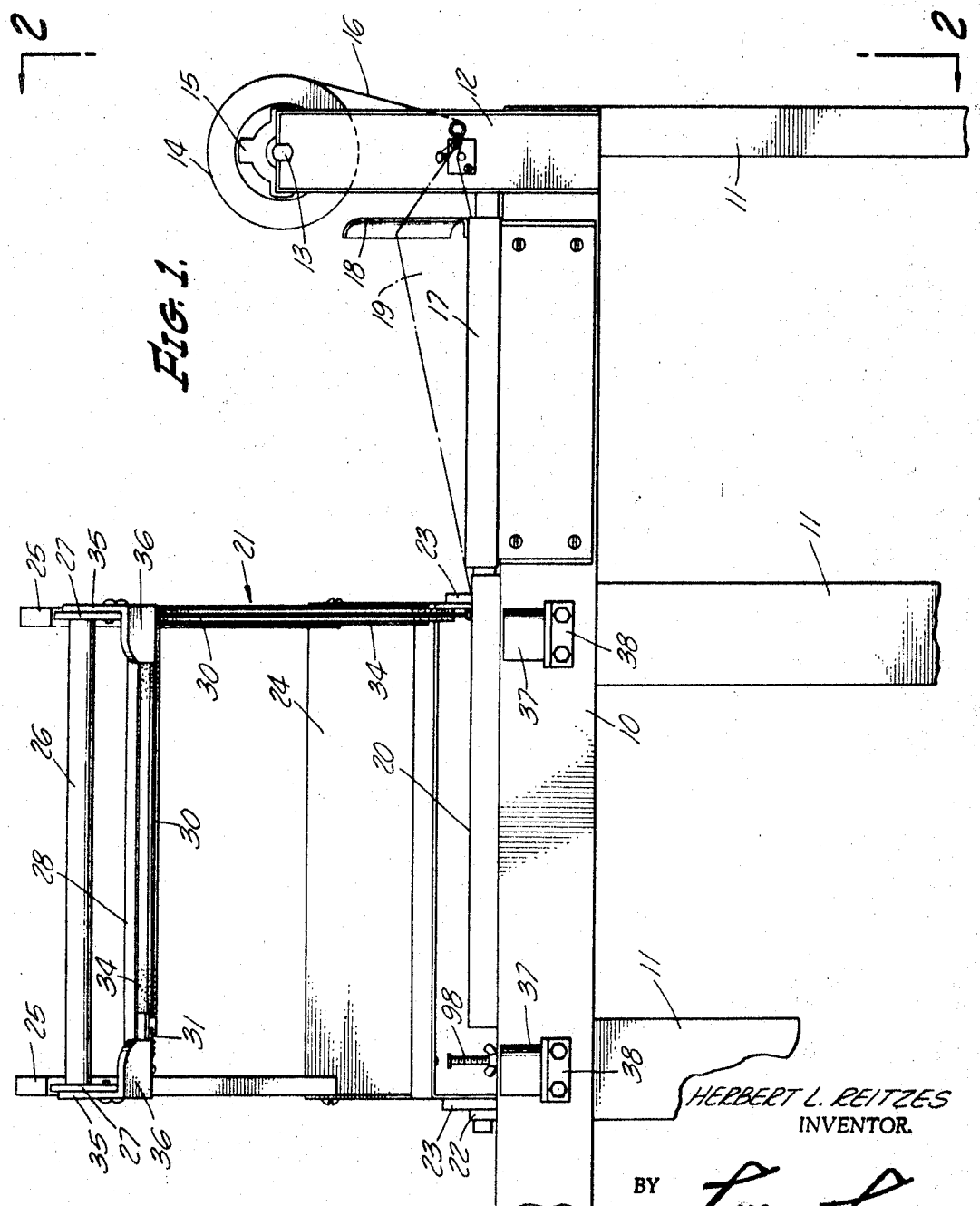
FIGURE 1 is a side elevation of one embodiment of a heat sealing machine incorporating the features of the present invention.
Figures 2, 3:
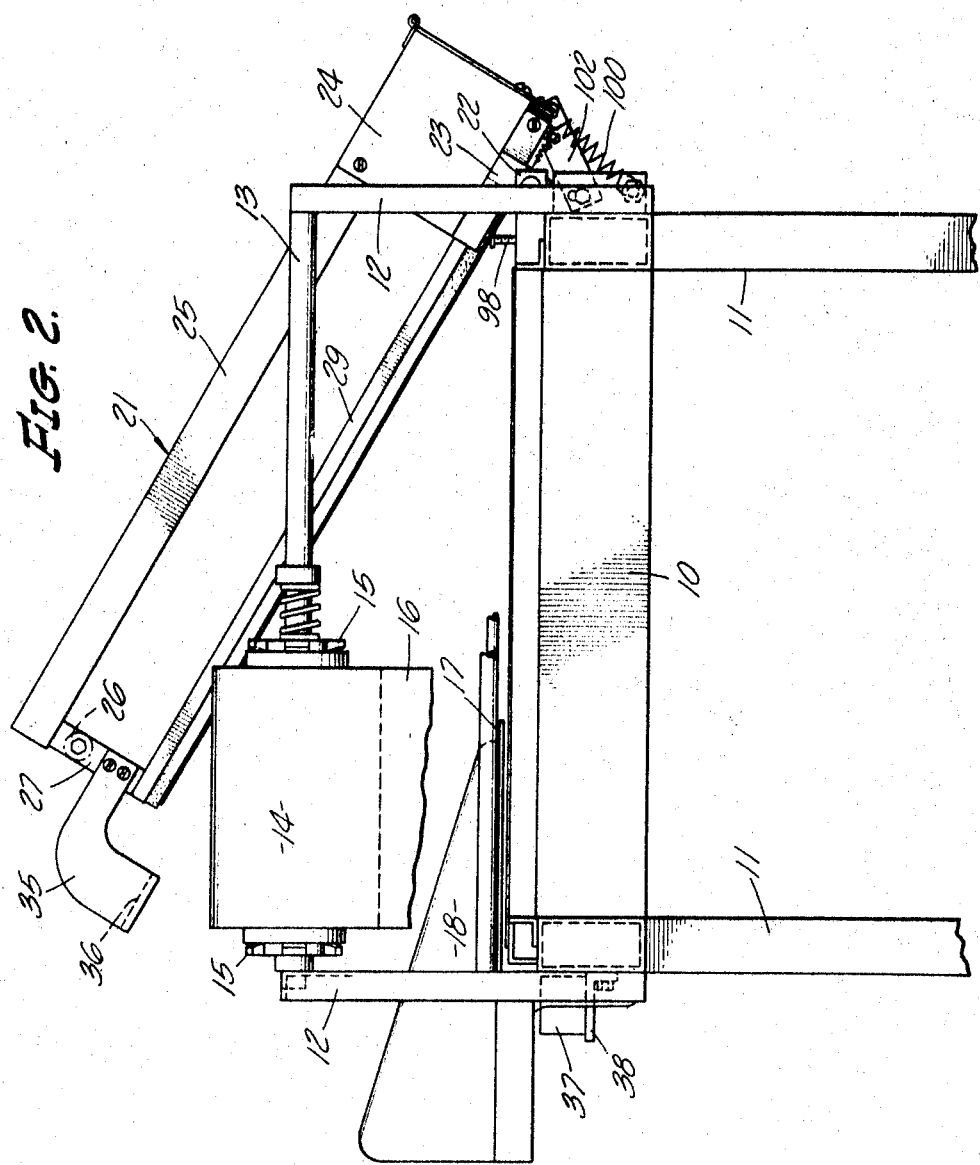
FIGURE 2 is an end elevation taken along lines 2—2 of FIGURE 1.
FIGURE 3 is a partial sectional view showing the heat sealing frame in the lowered position.

Referring now to FIGURES 1 and 2, a typical heat sealing machine comprises a table 10 supported above the floor by a plurality of legs 11 upon which the various elements of the sealing mechanism are mounted. At one end of the table 10 are a pair of upright brackets 12 between which there is suspended a rod 13 upon which a roll of plastic packaging film 14 is mounted. Suitable retaining means 15 may be mounted on rod 13 to maintain a desired position of roll 14 on the rod.

The plastic film of the type used in heat sealing packaging machines is normally supplied as a roll such as 14, in which the material has been folded along its length to form a double layer whereby the article to be packaged is inserted between the doubled-over sheets. Thus, as shown in FIGURE 1, the film 16 is wound off of the roll 14 and onto the upper surface of an insertion platform 17 mounted upon the table 10. As the film passes onto the insertion platform 17, the two layers are separated by a tapered guide 18 thus opening an envelope 19 in the film so that the product can be easily inserted therein.

Figure 4:
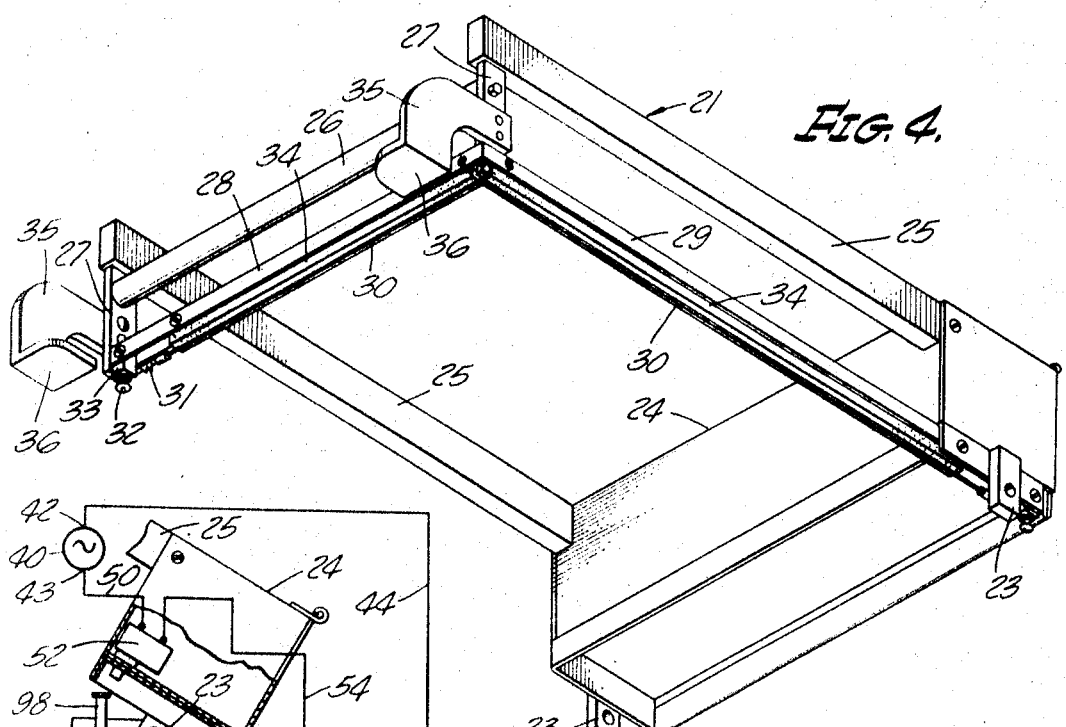
FIGURE 4 is a perspective view of the heat sealing frame.

After the product has been inserted in the envelope, the film is pulled by hand to the left and onto the sealing platform 20, which is also mounted on table 10. A rectangular frame 21 is pivotally mounted upon the table 10 by means of the mounting brackets 22 on table 10 and depending bracket members 23 mounted upon the frame 21. As can best be seen in FIGURE 4, frame 21 consists of a rear housing 24 with a pair of side arms 25 extending outwardly therefrom adapted to extend across the width of the table 10. A transverse bar 26 is coupled between the front ends of the side members 25 forming the rectangular configuration of the frame 21. At the front end of each of the side members 25 there are secured depending brackets 27 to which the transverse bar 26 is secured, and to which a second transverse member 28 is also secured. Another side member 29 is connected to the right front depending bracket 27 and extends back to the right lower side of the housing 24. Sealing wire 30 extends along the two lower members 28 and 29 and is coupled at one end to the housing 24 and at the other end through a spring 31 to a screw 32 threaded into a block 33 attached to the left depending bracket 27. A strip of resilient material 34 is secured to the underside of members 28 and 29 between the underside of those memzers and the sealing wire 30 so as to provide a cushion for the sealing wire when it is urged downwardly under pressure during the sealing operation. Also secured to each of the depending brackets 27 are a pair of angled brackets 35 which extend outwardly from the frame and turn downwardly and are provided with right angle portions 36 adapted to engage electromagnets when in the lowered position. FIGURE 3 shows the frame in the lowered position whereby the sealing wire 30 is brought into contact with the sealing platform 20 with a sheet of plastic film 15 interposed therebetween. In this position, the right angle portions 36 of the brackets 35 come into contact with electromagnets 37 mounted upon L-brackets 38 secured to the table 10. Thus, the right angle portions 36 of the brackets 35 form an enlarged contact surface so that the magnets 37 when activated will act thereon to hold the frame in the downward position.

Figure 5:
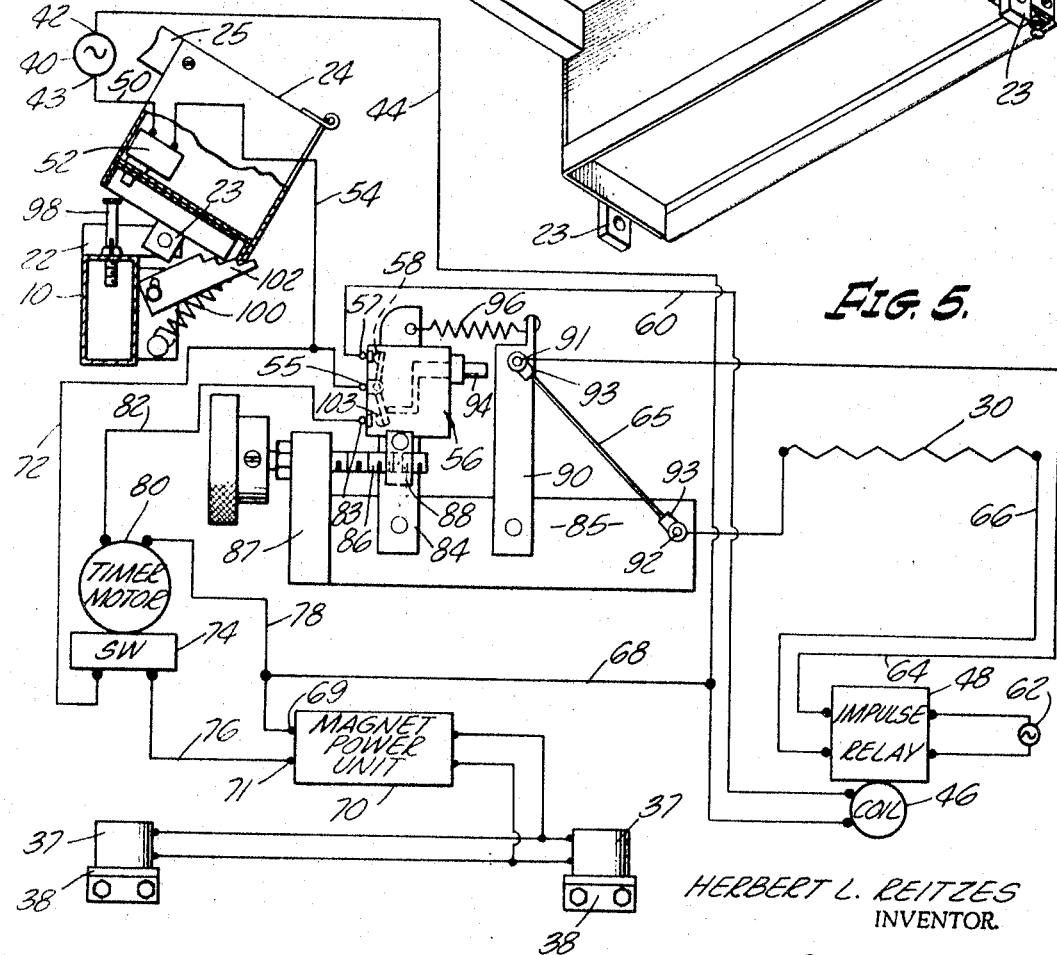
FIGURE 5 is a schematic circuit diagram of the timing and control system.

The control circuitry for the heating of the sealing wire 30 and the timing sequence for the control unit is housed inside of the housing 24. Referring to FIGURE 5, the details of this control circuitry together with the mechanical elements thereof are shown in schematic form. The circuit is coupled to a source of AC supply 40, which can be domestic 120 volt, 60 cycle. Terminal 42 of the source 40 is connected through conductor 44 to the coil 46 of relay 48. The other terminal 43 of source 40 is coupled through conductor 50, to the starting switch 52, then through conductor 54 to the center terminal 55 of the sequencing control switch 56. Control switch 56 is a double-pole, double-throw switch which in the normally closed position interconnects terminals 55 and 57 as shown by contact 58. Terminal 57 is connected through conductor 60 to the second terminal of relay coil 46. Relay 48 has its contacts connected to a source of AC or DC voltage 62 which may be a low voltage compared to source 40. Relay 48 couples this low voltage source 62 through conductor 64, control wire 65, sealing wire 30 and back through conductor 66 to the relay 48 again.

Terminal 42 of the source 40 is also connected through conductor 44 and conductor 68 to terminal 69 of the magnet power unit 70. Terminal 43 of source 40 is connected through conductor 50, conductor 54, conductor 72 through timing switch 74, conductor 76 to terminal 71 of the magnet power unit 70. The output terminals of magnet power unit 70 are connected directly to the appropriate terminals of the electromagnets 37. Conductor 68 is also connected through conductor 78 to timing motor 80, and the second terminal thereof is coupled through conductor 82 to terminal 83 of control switch 56.

Control switch 56 is mounted upon a bracket 84 pivotally secured to a frame member 85. A threaded adjusting element 86 is mounted in a bracket 87 secured to frame element 85 and is received in a threaded bushing 88 secured to the pivotal bracket 84. Thus, by adjusting the element 86 by turning the knob 89, the relative position of control switch 56 can be adjusted. Mounted to the frame member 85 is a pivot bar 90, and the control wire 65 is connected at 91 thereto. The other end of control wire 65 is connected at 92 to the frame member 85 and each end of control wire 65 is mounted through insulating collars 93 to prevent electrical contact between wire 65, frame 85 or pivot bar 90. Pivot bar 90 is mounted upon the frame 85 so that it is opposed to switch member 94 of control switch 56. Connected between the top of pivot bar 90 and the top of bracket 84 is a spring 96 which is under tension so as to tend to pull pivot bar 90 into contact with switch element 94, and therefore placing control wire 65 under a slight tension.

Mounted on the table 10 is an adjustable switch actuating rod 98 adapted to coact with starting switch 52 when the frame 21 is lowered. A spring 100 and a notched hinge piece 102 are mounted to the table 10 and normally urge the sealing frame 21 in its upward position.

As the frame 21 is lowered, switch 52 is closed as it comes into contact with the actuating rod 98. This causes current to flow through conductors 50 and 54, through control switch 56, conductor 60, relay coil 46 and conductor 44 thereby actuating relay 48. When the contacts of relay 48 close, the low voltage source 62 is connected across conductors 64 and 66 thereby causing current to flow in the control wire 65 and sealing wire 30. Sealing wire 30 and control wire 65 are both of a high resistance type, preferably Nichrome, whereby they become heated to an elevated temperature. Current also flows through conductors 50, 54, 72, normally closed timing switch 74, conductor 76, magnet power unit 70, conductor 68 and back through conductor 44 thereby causing current to flow in the magnet power unit, causing a magnetic field to be set up by the magnets 37 whereby the frame 21 will be held in its lowered position as shown in FIGURE 3.

This condition will remain, with the frame in the lowered position and the heat being applied to the wires 30 and 65 until control wire 65 has heated to a point where the tension applied thereto by the spring 96 permits control wire 65 to elongate to the extent that pivot arm 90 pivots to the left actuating switch part 94 and changing the state of control switch 56. When this is accomplished, contact 58 will open and contact 103 will close. When contact 58 is opened, current will cease to flow through conductor 60 and through relay coil 46 whereby relay 48 opens and current will cease to flow in the sealing wire 30 and the control wire 65. This will not, however, stop the flow of current through the magnet power unit 70 and therefore the magnetic fields will remain and the frame will still be held in the downward position.

As contact 103 in control switch 56 is closed, current will flow through conductor 82 through the timing motor 80 and through conductors 78 and 68, thus initiating the timed control provided by timer motor 80. When the motor 80 has run its timed course, it will open switch 74 thereby cutting off current to the magnet power unit 70 whereby the field set up by magnet 37 will cease and the action of spring 100 upon the frame 21 cause the frame to raise thereby opening switch 52.

The control wire 65 will have begun to cool as soon as contact 58 was opened, but its rate of cooling and therefore of its contraction is slower than the adjusted cooling time provided by the timing motor 80 so that the pivot arm 90 will not have returned to its upright position nor will contact 58 have been closed again before the frame 21 has been allowed to raise sufficiently to open switch 52. Thus, no repeat of the heat cycle is permitted. The running time of timer motor 80 provides sufficient cooling time for the film so that the sealed edges of the film will adhere sufficiently after removal of the pressure so as not to reopen. The adjustment provided by the threaded adjusting means 86 allows for increased heating time if the control switch is moved away from pivot arm 90 or decreased heating time if it is moved towards pivot arm 90. Likewise, this causes a variation in the time during which control switch 56 will return to its original state. Thus, variations and adjustments can be made by setting the timing of motor 80, the position of control switch 56, and the position of the starting switch actuating rod 98 as required for different heating and cooling periods depending upon the type and characteristic of the packaging film.

The present invention thus provides a very simple automatic control for heat sealing machines. The operator can quickly and easily insert a product in the envelope provided in the packaging film and then slide the package to be sealed under the sealing frame. The operator then lowers the frame and the rest of the sealing operation is automatically accomplished while the operator's hands are then free to insert another product in the envelope without having to bother about the rest of the sealing operation nor to guess what times are necessary for proper sealing of the package.

While a particular embodiment of the present invention has been shown and described, it will be obvious to persons skilled in the art that changes and modifications might be made without departing from this invention in its broader aspects. It is the aim of the appended claims to cover all such changes and modifications as fall within the true scope and spirit of the invention.

I claim:
1. A machine for heat sealing packages, comprising:
 a sealing element, frame means connected to said sealing element for moving said sealing element into contact with said packages, said sealing element comprising a first resistance wire;
 conducting means coupled to said first resistance wire for conducting current therethrough whereby said resistance wire is heated;
 magnetic means coupled to said frame means for maintaining said frame means in contact with said packages;
 first timing means coupled to said conducting means for controlling the period during which said sealing element is heated, said first timing means comprising a first switch means electrically coupled to said sealing element, actuating means mounted adjacent said switch means for actuating said switch means, a second resistance wire attached to said actuating means, said second resistance wire electrically coupled to said first resistance wire so that current is conducted therethrough, whereby heating of said second resistance wire permits the said actuating means to actuate said switch means stopping current in said first resistance wire;
 and, second timing means coupled to said magnetic means for controlling the period during which said frame means is in contact with said packages.

2. A machine for heat sealing packages, comprising:
 a sealing element, frame means connected to said sealing element for moving said sealing element into contact with said packages;
 conducting means coupled to said sealing element for conducting current therethrough whereby said element is heated;
 magnetic means coupled to said frame means for maintaining said frame means in contact with said packages;
 first timing means coupled to said conducting means for controlling the period during which said sealing element is heated;
 second timing means coupled to said magnetic means for controlling the period during which said frame means is in contact with packages;
 said conducting means including a sequence control switch, said switch having first and second conditions, said switch in said first condition coupling a source of electrical potential to said sealing element, to said magnetic means, and to said first timing means;
 said switch in said second condition coupling said potential source to said magnetic means and said timing means, said switch being responsive to said first timing means to change from said first condition to said second condition.

3. A device of the type described in claim 2, wherein: said first timing means includes a resistance wire electrically coupled to said sealing element, an actuating bar having one end pivotally mounted adjacent said sequence control switch, the other end of said bar being movable toward said switch, said resistance wire having one end stationary and the other end affixed to the movable end of said bar whereby movement of said movable end toward said switch places tension upon said wire, and tension means connected between said movable end of said bar and said switch.

4. A device of the type described in claim 3, wherein: said second timing means comprises a timing motor and a timing switch actuated by said motor, said timing motor being coupled to said sequence control switch and responsive to the second condition thereof, said timing switch being electrically coupled to said source of electrical potential and to said magnetic means.

5. A heat sealing packaging machine comprising:
 a table having a planar surface, a frame pivotally mounted upon said table, a resistance wire affixed along the under side of said frame;
 electromagnetic means mounted upon said table for holding said frame in a downwardly pivoted position in contact with the planar surface of said table, conducting means coupled to said resistance wire for conducting current through said wire whereby said wire is heated;
 first timing means coupled to said conducting means for controlling the time during which current is conducted through said wire;
 second timing means coupled to said electromagnetic means for controlling the time during which said frame is held down;
 switch means mounted upon said frame electrically coupled to said electromagnetic means and to said conducting means, and actuating means mounted upon said table for actuating said switch means when said frame is lowered;
 said conducting means including a sequence control switch having first and second conditions, said switch in said first condition coupling a source of electrical potential to said resistance wire, said electromagnetic means, and said first timing means, said switch in said second condition coupling said potential source to said electromagnetic means and to said second timing means, said switch being responsive to said first timing means to change from said first condition to said second condition.

6. A device of the type described in claim 5, wherein, said first timing means includes a second resistance wire electrically coupled to the first resistance wire, an actuating bar having one end pivotally mounted adjacent said sequence control switch, the other end of said bar being movable toward said switch, said second resistance wire having one end stationary and the other end affixed to the movable end of said bar whereby movement of said movable end toward said switch places tension upon said wire, and tension means connected between said movable end of said bar and said switch.

7. A device of the type described in claim 6, wherein: said second timing means comprises a timing motor and a timing switch actuated by said motor, said timing motor being coupled to said sequence control switch and responsive to the second condition thereof, said timing switch being electrically coupled to said source of electrical potential and to said magnetic means.

References Cited

UNITED STATES PATENTS

| | | | |
|---|---|---|---|
| 2,305,010 | 12/1942 | Kenney et al. | 53—373 X |
| 3,012,387 | 12/1961 | Jacobs et al. | 53—373 X |
| 3,047,991 | 8/1962 | Siegal et al. | 53—390 X |
| 3,214,884 | 11/1965 | Langdon | 53—373 X |
| 3,239,993 | 3/1966 | Cherrin | 53—182 |
| 3,284,987 | 11/1966 | Sigmon | 53—373 |
| 2,301,070 | 11/1942 | Myers | 337—140 X |

THERON E. CONDON, Primary Examiner

R. L. SPRUILL, Assistant Examiner

U.S. Cl. X.R.

53—182, 390